United States Patent
Soane et al.

(10) Patent No.: US 6,517,933 B1
(45) Date of Patent: Feb. 11, 2003

(54) HYBRID POLYMER MATERIALS

(75) Inventors: David S. Soane, Piedmont, CA (US); Matthew R. Linford, Orem, UT (US); David A. Offord, Castro Valley, CA (US); Dan B. Millward, Alameda, CA (US); William Ware, Jr., Palo Alto, CA (US)

(73) Assignee: Nano-Tex, LLC, Emeryville, CA (US)

( * ) Notice: Subject to any disclaimer, the term of this patent is extended or adjusted under 35 U.S.C. 154(b) by 119 days.

(21) Appl. No.: 09/731,144

(22) Filed: Dec. 6, 2000

Related U.S. Application Data

(60) Provisional application No. 60/176,650, filed on Jan. 18, 2000.

(51) Int. Cl.[7] ............................. B32B 7/02; C08H 5/04
(52) U.S. Cl. ..................... 428/221; 428/364; 525/50; 525/55; 525/56; 525/66; 525/420; 525/540; 527/103; 527/200; 527/201; 527/203; 527/207; 527/300; 527/311; 527/312; 527/313; 527/400; 527/600

(58) Field of Search ................... 428/364, 221; 525/50, 55, 56, 66, 420, 540; 527/103, 200, 201, 203, 207, 300, 311, 312, 313, 400, 600

(56) References Cited

U.S. PATENT DOCUMENTS 3,742,985 A * 7/1973 Rubenstein ................. 138/141

* cited by examiner

*Primary Examiner*—Samuel A. Acquah
(74) *Attorney, Agent, or Firm*—Jacqueline S. Larson

(57) ABSTRACT

The invention is directed to a hybrid polymer material or system that combines naturally occurring building blocks with synthetic building blocks. The sets of naturally occurring and synthetic building blocks are mixed and joined on a molecular or nanoscopic level to give homogeneous or microphase-separated morphologies to the resulting mixed polymer system. These hybrid polymers combine the comfort attributes of natural materials with the robustness and design properties of synthetic materials.

25 Claims, No Drawings

HYBRID POLYMER MATERIALS

This application claims the benefit of copending provisional U.S. application Serial No. 60/176,650, filed on Jan. 18, 2000.

FIELD OF THE INVENTION

This invention is directed to the field of polymer materials, and more particularly to hybrid polymer materials useful for fiber, plastic, and elastomer applications.

BACKGROUND OF THE INVENTION

Naturally occurring polymers, such as cellulose (e.g. cotton and starch) and polyamides (e.g. structural and soluble proteins such as wool or silk) have found widespread usage in the fiber and apparel industries. Cotton- and wool/silk-based clothing articles and home furnishing items are comfortable to wear and are characterized by their superior tactile properties. However, these materials have other characteristics that are often considered to be negative, such as wrinkling; the potential to shrink upon laundering; poor resistance to mildew, moths, or bacteria; and poor flame resistance.

Over the years, a number of chemical finishing agents have been employed in an attempt to improve the properties of natural fibers. For example, crosslinking agents (resins) have been explored to achieve wrinkle resistance and durable-press properties. Resins improve wrinkle recovery, fabric smoothness, dimensional stability, washfastness of some dyes, pilling resistance, ease of ironing, durability of finishes (repellents, hand modifiers, embossing, etc.), and general appearance. However, the presence of the resins also results in losses in tear strength, tensile strength, abrasion resistance, reduced moisture regain, possible damage due to chlorine retention, potential odors, potential discoloration, and sewing problems. Durable-press fabrics also often have stiff, harsh, uncomfortable fabric tactile (hand) properties.

Fabric softeners/lubricants are commonly added to resin-treated fabrics to mitigate some of these deficiencies. Softeners improve the hand of the fabric and increase abrasion resistance and tear strength. However, softeners suffer from a lack of durability to repeated launderings.

Flame-retardants and antibacterial agents have also been applied to natural fibers. However, if they are used in molecular form, they will typically be rapidly leached from the fabric during home laundering and commercial dry-cleanings. To slow their release, they can be dispersed in a polymeric matrix. However, application of such a finish can alter the hand of the fabric.

Synthetic fibers are robust, and can be engineered to exhibit wide-ranging mechanical behavior. They are, however, generally less comfortable to wear than naturally occurring polymers. Much of this perceived discomfort is associated with the lower level of moisture absorption and perspiration transport. The synthetic materials generally possess desirable mechanical performance properties, such as wrinkle resistance, high modulus and strength, and in certain cases, unusual elasticity.

Among the most commonly known synthetic fibers are polyesters and polyamides (nylons). A polyester fiber is manufactured from a substance composed of an ester of a dihydric alcohol and a diacid (such as terephthalic acid). The most widely used polyester is made from the linear polymer of poly(ethylene terephthalate); other examples are poly(butylene terephthalate) and poly(trimethylene terephthalate). Certain polyesters can be engineered with hard and soft segments, forming polyester elastomers. Examples include the Hytrel® series from DuPont. Polyamides contain recurring amide groups as integral parts of the main polymer chains, both aliphatic and aromatic versions, are possible. Aliphatic forms include Nylon 6 (formed from caprolactam) and Nylon 6,6 (formed by hexamethylene diamine and adipic acid), whereas aromatic forms are exemplified by Nomex® (formed of m-phenylene isophthalamide), Kevlar® (formed by p-phenylene diamine and terephthalic acid), and PBI fiber. Polyamides can be shaped into fibers and other forms by standard processes such as spinning, film formation, extrusion, and injection molding.

Other synthetic fibers based on organic synthesis combining hard and soft segments include spandex such as DuPont's Lycra®, which is an alternating linear combination of an aromatic polyurethane block and polyethylene glycol elastomeric block, or DuPont's Tactel®, which has properties of both nylon and spandex. Exceptional elasticity can be achieved by such specially designed microphase-separated morphology of the block copolymer.

Despite the above synthetic accomplishments, little has been attempted in the direction of combining naturally occurring materials and synthetic materials on the nanoscopic level. Nanoscopic mixing begins with the engineering of fundamental molecular building blocks. Existing standard methods of increasing the range of properties and usefulness of cellulosic fibers include (1) formation of blends and composites of cellulosic and synthetic fibers, (2) chemical modification of cellulose (such as cellulose acetate), (3) production of regenerated cellulose (e.g. rayon), and (4) formation of graft copolymers. Indeed, graft copolymers made from cellulose have been intensively studied in the literature, chiefly in the area of vinyl copolymers. Free-radical initiation techniques, often involving high-energy radiation, are used. The resulting systems are heterogeneous on a macroscopic scale, and downstream processing is very difficult to manage.

SUMMARY OF THE INVENTION

This invention is directed to a hybrid polymer material or system that combines naturally occurring building blocks with synthetic building blocks. These hybrid polymers combine the comfort attributes of natural materials with the robustness and design properties of synthetic materials.

More particularly, the hybrid polymers of the invention comprise i) natural materials, as one set of building blocks; and ii) synthetic materials (e.g., those having ester, amide, and acrylate/methacrylate groups) as a second set of building blocks. The natural material building blocks may be comprised of polysaccharides, cellulose and its derivatives (e.g., digested, chemically modified cotton), and polypeptides and derivatives thereof (e.g., digested low grade wool). The building blocks include reactive functional groups, which act as linkages to complete the hybrid architecture. The sets of naturally occurring and synthetic building blocks are mixed and joined on a molecular or nanoscopic level via the reactive functional groups to give homogeneous or microphase-separated morphologies to the resulting mixed polymer system.

The hybrid polymer of the invention may be comprised of an alternating linear combination of naturally occurring building blocks and synthetic building blocks, a random linear combination of natural and synthetic building blocks, a statistical linear distribution of natural and synthetic building blocks, or combinations of these. The hybrid polymer may include diblock, triblock, and multiblock morphologies, as well as graft copolymer morphologies. Alternatively, the hybrid polymer may comprise a crosslinked network, which would occur if two sets of monomers or prepolymers were mixed together. In another embodiment, the hybrid polymer comprises hard or crystalline sections of naturally occurring building blocks linked together by soft or rubbery sections of synthetic building blocks.

The hybrid polymers of this invention are suitable for fiber spinning, as well as for plastic or rubbery object shaping by film formation, injection molding, extrusion and other compounding techniques. The specific properties of the polymer are determined by the molecular design of the component building blocks and the exact composition of the hybrid polymer. The resulting unique materials offer both natural appeal and synthetic robustness.

DETAILED DESCRIPTION OF THE INVENTION

The hybrid polymer materials of the present invention comprise a set of naturally occurring building blocks and a set of synthetic building blocks, the two sets of building blocks being combined at a molecular level via chemical bonds. This gives polymeric materials that are homogeneous or microphase-separated, and also allows for the design of final polymers exhibiting desirable characteristics.

The term "building block sets" as used herein defines monomers, dimers, oligomers, or macromers ("building blocks"), all possessing reactive groups that will bond with the reactive groups of the building blocks of other building block sets. In one presently preferred embodiment, the building blocks of one set form polymer blocks that are crystalline and those of the second set form polymer blocks that are elastomeric. The hybrid materials are processable by conventional polymer engineering processes.

To synthesize the hybrid polymers of the present invention, a set of naturally occurring building blocks is mixed together with a set of synthetic building blocks. The building blocks of each set have functional groups that react with functional groups on the building blocks of the other set. The mixture is polymerized by induction of this reactivity, thus producing the hybrid polymer. Polymerization can be induced by methods known in the art, such as by heat, light (UV-light, gamma radiation, x-rays, visible radiation, IR, microwaves), sonication, or electron beams. Chemical means, including free-radical initiators that may be induced by heat, light, or a redox system, at elevated temperature or room temperature, may also be used. These include reagents such as AIBN, benzoyl peroxide, potassium persulfate, or hydrogen peroxide. Such initiators and catalysts are commercially available. The naturally occurring building blocks and synthetic building blocks are mixed together in a ratio of from about 95:5 to about 5:95, preferably from about 80:20 to about 20:80.

In preparing the hybrid polymers of the invention, the process temperature can vary widely, depending on the reactivity of the reactants. However, the temperature should not be so high as to decompose the reactants or so low as to cause inhibition of the reaction or freezing of the solvent. Unless specified to the contrary, the processes described herein take place at atmospheric pressure over a temperature range from about 5° C. to about 250° C., more preferably from about 15° C. to about 160° C., and most preferably at "room" or "ambient" temperature ("RT"), e.g. about 20° C. The time required for the processes herein will depend to a large extent on the temperature being used and the relative reactivities of the starting materials. Following formation, the hybrid polymers can be formed into a variety of shapes, including fibers, sheets, formed articles, and the like by methods known in the art, such as extrusion or molding. Unless otherwise specified, the process times and conditions are intended to be approximate.

This invention is further directed to articles prepared from the hybrid polymers of this invention. The hybrid polymers are suitable for fiber spinning, as well as for plastic or rubbery object shaping by film formation, injection molding, extrusion and other compounding techniques known to those of skill in the art. In a presently preferred embodiment of the invention, fibers, yarns, fabrics, textiles, or finished goods (encompassed herein under the terms "textiles" and "webs") are made from the hybrid polymer material. Such textiles or webs will possess attributes of comfort (such as breathability and a soft hand) associated with natural materials together with the robustness and design properties (such as wrinkle resistance) resulting from synthetic materials.

The novel webs of the present invention are intended to include fibers, and woven and non-woven fabrics, as well as cellulose-based papers, and the like. They can comprise fibers in the form of continuous or discontinuous monofilaments, multifilaments, staple fibers, and yarns containing such filaments and/or fibers, and the like. The fibers can be made from the hybrid polymeric material by any of the methods known to those skilled in the art, including melt spinning, wet spinning, dry spinning, and the like. The textiles or webs may be a sheet-like structure (woven or non-woven, knitted, tufted, or stitch-bonded) comprised of hybrid polymeric fibers. Included with the fibers can be non-fibrous elements, such as particulate fillers, binders, sizes and the like.

Naturally occurring building blocks that may be used to form the hybrid polymers in accordance with this invention include monosaccharides, disaccharides and polysaccharides (e.g., celluloses, modified celluloses, digested or chemically modified cotton, starches, chitin, chitosan, carrageenans, alginates, etc.), wood derivatives, lipids, proteins, RNA, DNA, lignin and other amino acids, oligopeptides, polypeptides, and low grade wool.

Synthetic building blocks for use in this invention may be chosen from any synthetic polymer-forming molecule that has reactive or functional groups that will bind chemically with a functional group on the naturally occurring building blocks. For example, all cellulosics contain hydroxyl groups. Wool, silk, and other peptide-based textiles contain hydroxyl, amine, carboxylate, and thiol groups (the latter as disulfides).

Specific amine-reactive groups include isothiocyanates, isocyanates, acyl azides, N-hydroxysuccinimide esters, sulfonyl chlorides, aldehydes, glyoxals, epoxides (such as glycidyl compounds), oxiranes, carbonates, arylating agents, imidoesters, carbodiimides, anhydrides, halohydrins, NHS-esters, sulfo-NHS-esters, phenylazide (when activated by UV light it will react with amine nucleophiles), iodoacetamide, bromoacetamide, acyl chlorides, acyl bromides, and fluorobenzene derivatives. Carboxyl groups can also be made amine-reactive by reaction with a carbodiimide compound—both water-soluble (e.g., 1-ethyl-3-(3-dimethylaminopropyl)-carbodiimide) and solvent-soluble forms (e.g., dicyclohexylcarbodiimide and diisopropylcarbodiimide) are available.

Carboxylate-reactive groups include diazoalkanes and diazoacetyl compounds, carbonyl diimidazole, and carbodiimides.

Hydroxyl-reactive functional groups include epoxides, oxiranes, carbonyl diimidazole, N,N'-disuccinimidyl carbonate or N-hydroxysuccinimidyl chloroformate, alkyl halides, isocyanates, and halohydrins. Hydroxyl groups may also be oxidized enzymatically or with periodate.

Thiol groups react with haloacetyl and alkyl halide derivatives, maleimides, aziridines, acryloyl derivatives, arylating agents, and thiol-disulfide exchange reagents such as pyridyl disulfides, disulfide reductants, and 5-thio-2-nitrobenzoic acid.

Thus, for example, the synthetic building blocks may contain adjacent carboxyl groups that can form five- and six-membered cyclic anhydrides. The anhydrides form with the aid of a catalyst when the synthetic building block is heated and dried. These cyclic anhydrides react with naturally occurring building blocks that contain hydroxyls or amines. Alternatively, the functional groups of the synthetic building blocks may contain epoxide groups or epoxide precursors, such as halohydrins. Epoxides can react with amines and hydroxyls. Also, methylolacrylamide (methylol groups, e.g. DMDHEU, are known to react with cellulosics) may be copolymerized into the hybrid polymer.

Chitosan and digests of wool will be used herein as examples of naturally occurring building blocks to illustrate the present invention. The invention, however, is not limited to these materials but includes all other naturally occurring polymers that contain, or can be engineered to contain, one or more reactive functionalities.

Wool can be digested or dissolved by a variety of methods known in the art. The solubilized polypeptides in these digests will contain reactive functional groups such as amines, hydroxyls, and carboxyls, which are present in wool and can be used to bind the wool segments to synthetic building blocks.

Chitosan is chitin with some of the N-acetyl groups removed, (see Formula 1).

Formula I

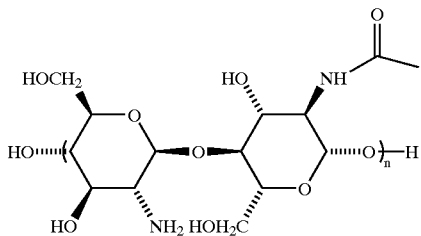

Chitosan will conveniently be represented herein by the below drawing:

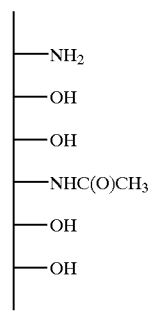

Chitosan is a natural biocide, which provides an added advantage to garments or medical supplies containing it. It is believed that the biocidal action is due to the amines on the molecule. The amine groups of chitosan can react with synthetic building blocks that have amine-reactive groups on them, to give the hybrid polymers of the invention. Chitosan also has hydroxyl groups, which can be used in reactions with synthetic building blocks at low pH conditions where amines are unreactive. In another embodiment, chitosan is derivatized with a free-radical polymerizable moiety (such as acryloyl chloride). The resulting acrylamide can then react with unsaturated synthetic building blocks. In yet another embodiment, condensation monomers are utilized to graft polymer chains onto chitosan by condensation methods.

Synthetic building blocks that either contain, or can be derivatized to contain, groups for reacting with the amines and hydroxyls of the chitosan or the wool digests include virtually any known polymer, copolymer, or oligomer. Some non-limiting examples of the myriad of available polymers include poly(dimethylsiloxane) (PDMS), polyethylene glycols (PEG), polypropyleneglycols (PPG), butadiene, styrene-butadiene, styrene maleic anhydride, polyethylene, polypropylene (all tacticities), polyamides, polyesters, polyacrylic acid, polyvinylchloride, polyvinylacetate, polyvinylidine fluoride, polytetrafluoroethylene, polyacrylamide, poly(acrylic acid-co-maleic acid), polyacrylonitrile, polyallylamine, polyaniline, polyethyleneimine, polyacrylates (e.g., polybutylacrylate), polymethacrylates (e.g., polymethylmethacrylate, polybenzylmethacrylate), polyethyleneterephthalate, polybutylene terephthalate, poly(1-butene) (isotactic and atactic), Nylon 6, Nylon 66, Nomex® and Kevlar® (both of which are aromatic polyamides from DuPont), poly(bisphenol A-co-epichlorohydrin), PBI, and copolymers or mixtures of such polymers.

Reaction schemes 1 and 2 are illustrative of two possible reactions between chitosan and polymers with amine-reactive groups.

Reaction Scheme 1. Reactivity of chitosan with an epoxidated polymer (this same reactivity will also be displayed with a digest of wool):

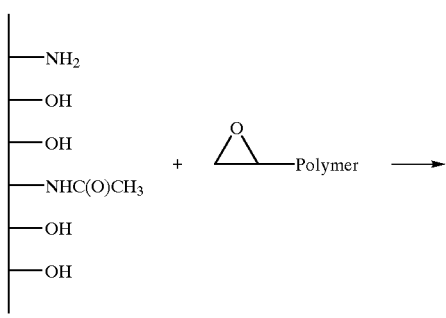

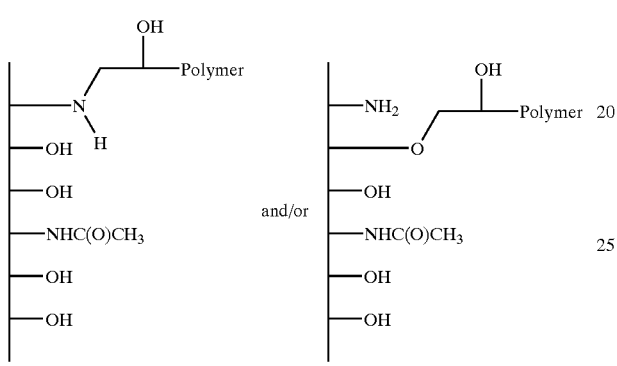

Reaction Scheme 2. Reactivity of chitosan with a diepoxylated polymer (this same reactivity will also be displayed with a digest of wool). Note that the reaction could have taken place with one or two of the hydroxyl groups instead of the amines. It is possible for both epoxy groups to react with the same chitosan oligomer:

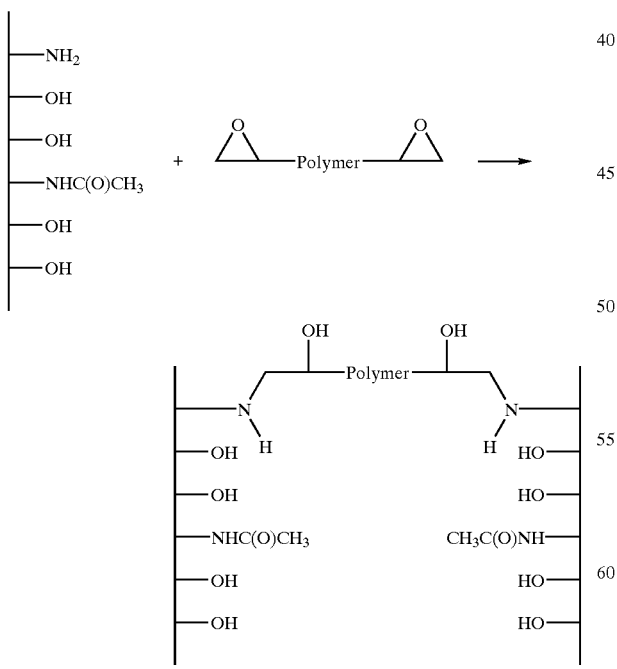

In another embodiment, chitosan (or a wool extract) is reacted with a monomer such as glycidyl (meth)acrylate or (meth)acryloyl chloride to acrylamide groups on the chitosan (Reaction Scheme 3). Then, synthetic building blocks are added and polymerized with the derivatized chitosan (Reaction Scheme 4). Examples of polymerizable monomers include the non-limiting examples of acrylates (acrylic acid and esters such as methyl acrylate, butyl acrylate, etc.), methacrylates (methacrylic acid and esters such as methyl methacrylate, butyl methacrylate, etc.), mono- and diacrylated poly(ethylene glycol), mono- and dimethacrylated poly(ethylene glycol), styrene derivatives, vinyl ethers, maleic acid and maleic acid esters. Also included are macromonomers, which are oligomers or polymers of monomers that are functionalized with polymerizable olefinic groups. Generally, these polymerizable groups are at the end of the chain and can be incorporated into polymers to yield graft copolymers.

Reaction Scheme 3. Reaction of chitosan with acryloyl chloride (this same reactivity will also be displayed with a digest of wool):

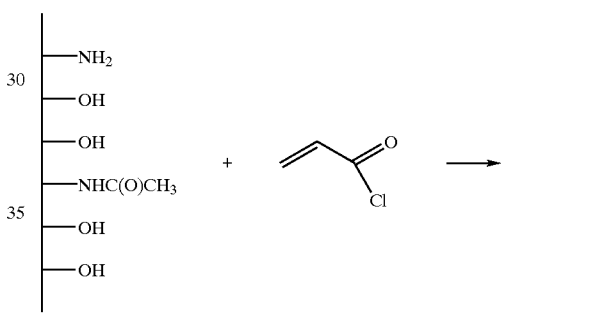

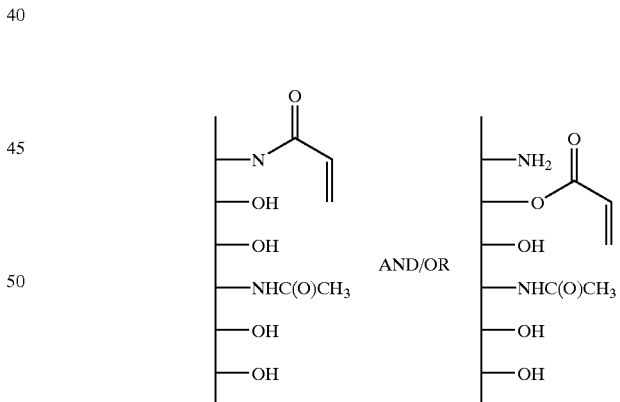

Reaction Scheme 4. Reaction of chitosan, which previously reacted with acryloyl chloride, with other unsaturated monomers in the presence of an initiator (this same reactivity will also be displayed with a digest of wool). In reality, the unsaturated group on the chitosan or wool may be grafted into a growing polymer chain:

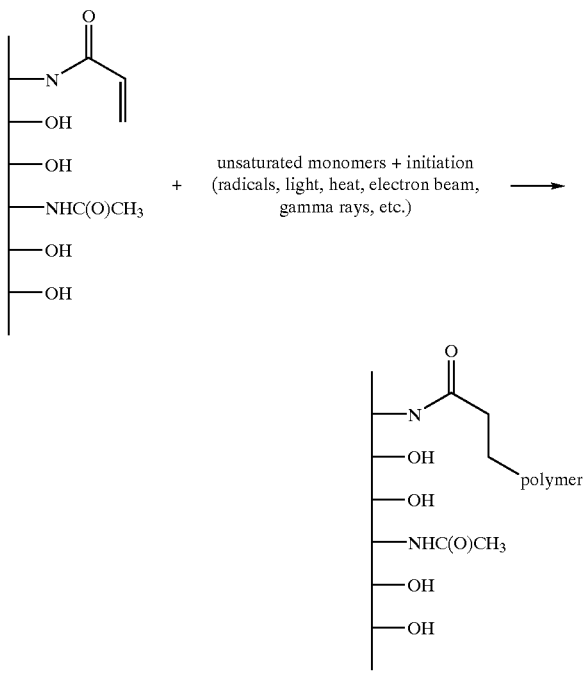

In yet another embodiment, polymer chains are grafted onto chitosan by condensation methods. Possible condensation monomers include those used to make polyamides and polyesters, as well as siloxane polymers. Monomers that polymerize through ring opening, such as ε-caprolactam, ε-caprolactone, ethyleneoxide, and ethylene imine, may also be utilized (see Reaction Scheme 5).

Reaction Scheme 5. Reaction of chitosan with ε-caprolactam or ε-caprolactone to produce graft copolymers (this same reactivity will also be displayed with a digest of wool):

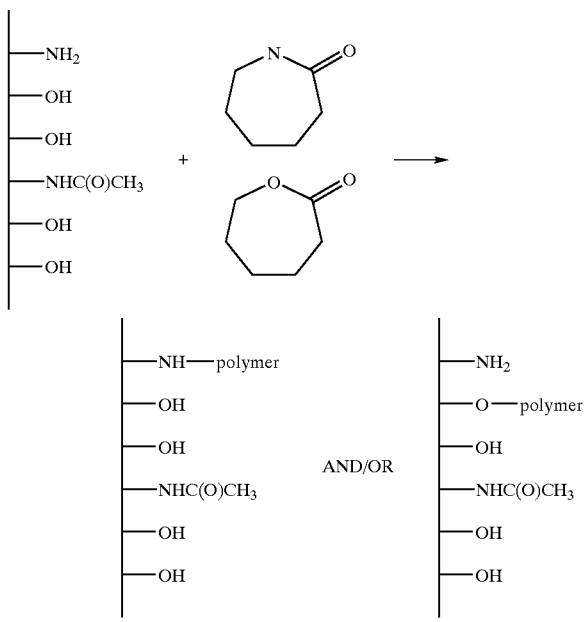

In a further embodiment, hybrid materials are made from, for example, alginate, and/or carrageenan. Alginate and carrageenan are inexpensive, available polymers. The alginate has carboxyl groups, and the carrageenan has sulfonate groups.

A hybrid polymer fiber according to the invention that has a core and a shell with different charges can be prepared during the extrusion process. For example, a material that has amine groups on its surfaces (e.g. chitosan) will complex with a negatively charged polymer, such as a carrageenan, poly(acrylic acid) or a copolymer of acrylic acid, or poly (styrene sulfonate). Furthermore, a polyelectrolyte, such as chitosan or carrageenan or a hybrid material of these polymers or another polyelectrolyte, can be extruded into a bath that contains an oppositely-charged polyelectrolyte. For example, chitosan or a hybrid chitosan copolymer can be extruded into a bath containing a polymer that complexes with it and coats it. Similarly, alginates or alginate hybrids can be extruded into a bath that contains a positively charged polymer. Desired characteristics could be thus added to the hybrid polymer fiber. For example, hybrid chitosan fibers could be extruded into a base that has a finishing agent that contains carboxyl groups, such as an acrylic acid/ fluoromonomer finish to make the fiber water-repellent during the extrusion process.

A hybrid polymer of the invention could be plasticized by adding to it an agent that will complex with it to add softness or a soft hand to the material. For example, a small amount of a long-chain carboxylic acid or long-chain sulfonic acid could be added to the chitosan hybrid copolymer prior to extrusion. The carboxylic acid in the softener would complex with an amine of the chitosan, holding it in place. Alternatively, propylene glycol alginate, which is commercially available, could plasticize the copolymer fiber as it is extruded.

EXAMPLES

The following examples are intended to be illustrative and should not be construed as limitations of the present invention.

Example 1

Chitosan is heated in the presence of α,ω-diglycidyl-terminated polyethyleneglycol (PEG). The PEG (in this and the following examples) can have a wide range of molecular weights, and the polymers may have some grafts in them. Grafts or branches can include those deliberately added to the material in synthesis as well as those that are not intended but result from imperfections in the process of polymer synthesis. The PEG is soluble in water and the chitosan is soluble in aqueous acidic media. The acid solution is wet-spun into a base bath, which should make the polymer insoluble. The resulting graft copolymer will phase-separate, with the chitosan regions together as a high Tg (glassy or crystalline) material and the PEG regions forming a liquid-like or rubbery region. Raising the pH also deprotonates the amine, making it more reactive with the oxirane ring.

Example 2

A wool digest is heated in the presence of α,ω-diglycidyl-terminated polyethyleneglycol (PEG). The PEG (in this and the following examples) can have a wide range of molecular weights, and the polymers may have some grafts in them. Grafts can include those deliberately added to the material in synthesis as well as those that are not intended but result from imperfections in the process of polymer synthesis. After removal of solvent through extrusion or other methods known in the art, the resulting graft copolymer will phase-separate, with the wool/polypeptide regions together as a high Tg (glassy or crystalline) material and the PEG regions forming a liquid-like or rubbery region.

In this and future examples, the wool digest may be used as an aqueous solution or dispersion or the water may be removed before or after adding another monomer or polymer to the wool digest in order to make a hybrid material.

Example 3

Chitosan is heated in the presence of α,ω-diglycidyl-terminated polypropyleneglycol (PPG). While the PPG has low water solubility, the chitosan will be soluble in aqueous acidic media. The acid solution is wet-spun into a base bath, which makes the polymer insoluble. The resulting graft copolymer will phase separate, with the chitosan regions together as a high Tg (glassy or crystalline) material and the PPG regions forming a liquid-like or rubbery region.

Example 4

A wool digest is heated in the presence of α,ω-diglycidyl-terminated polypropyleneglycol (PPG). A surfactant may be present to help solubilize the PPG. Upon removal of the solvent, the resulting hybrid material will phase separate, with the wool/polypeptide regions together as a high Tg (glassy or crystalline) material and the PPG regions forming a liquid-like or rubbery region.

Example 5

Chitosan is heated in the presence of a glycidyl-terminated or α,ω-diglycidyl-terminated copolymer of polyethyleneglycol and polypropyleneglycol (PEG/PPG). The water solubility of the PEG/PPG polymer will increase as the fraction of PEG in it increases. The chitosan will be soluble in aqueous acidic media. The acid solution is wet-spun into a base bath, making the polymer insoluble. The resulting graft copolymer phase separates, with the chitosan regions together as a high Tg (glassy or crystalline) material and the PEG/PPG regions forming a liquid-like or rubbery region.

Example 6

A wool digest is heated in the presence of a glycidyl-terminated or α,ω-diglycidyl-terminated copolymer of polyethyleneglycol and polypropyleneglycol (PEG/PPG). The water solubility of the PEG/PPG polymer will increase as the fraction of PEG in it increases. Upon removal of the solvent by spinning, the resulting graft copolymer phase separates, with the polypeptide regions together as a high Tg (glassy or crystalline) material and the PEG/PPG regions forming a liquid-like or rubbery region.

Example 7

Chitosan is heated in the presence of glycidyl-terminated or α,ω-diglycidyl-terminated poly(dimethylsiloxane) (PDMS). This material should have some solubility in acid media depending on the amounts of chitosan and PDMS in the hybrid. The acid solution is wet-spun into a base bath to make the polymer insoluble. The resulting graft copolymer phase separates, with the chitosan regions together as a high Tg (glassy or crystalline) material and the PDMS regions forming a liquid-like or rubbery region.

The PDMS chains could also be attached by using PDMS-acrylate, PDMS-diacrylate, PDMS-methacrylate, or PDMS-dimethacrylate, where the chitosan amines react with the (meth)acrylate carbon-carbon double bonds. The molecular weight of the PDMS can vary from high to low.

Example 8

A wool digest is heated in the presence of glycidyl-terminated or α,ω-diglycidyl-terminated poly(dimethylsiloxane) (PDMS). A surfactant can be employed to increase the solubility of the PDMS. Upon removal of the solvent, the resulting graft copolymer phase separates, with the polypeptide regions together as a high Tg (glassy or crystalline) material and the PDMS regions forming a liquid-like or rubbery region.

The PDMS chains could also be attached by using PDMS-acrylate, PDMS-diacrylate, PDMS-methacrylate, or PDMS-dimethacrylate, where the polypeptide amines react with the (meth)acrylate carbon-carbon double bonds. The molecular weight of the PDMS can vary from high to low.

Example 9

Chitosan is heated in the presence of a polymer that has one or more amine-reactive functional groups on it, such as carboxyl groups, activated carboxyl groups, (meth)acrylate groups, and epoxides, e.g., glycidyl groups. This material will have some solubility in acid media depending on the amount of chitosan, the number of polymer grafts, and the nature of the grafted polymer. The acid solution is wet-spun into a base bath, which should make the polymer insoluble.

Example 10

A wool digest is heated in the presence of a polymer that has one or more amine-reactive functional groups on it, such as carboxyl groups, activated carboxyl groups, (meth)acrylate groups, and epoxides, e.g., glycidyl groups. A surfactant may be employed to solubilize the polymer. Phase separation may occur upon removal of the solvent through spinning or other means known in the art.

Example 11

Chitosan is heated in the presence of ε-caprolactam to induce ring-opening polymerization and form nylon 6 grafts on the chitosan polymer. If the nylon chains are not too long, the complex will be soluble in acid because of the amines on the chitosan and the amines at the ends of the grafted nylon chains. The acid solution of this material can then be extruded/spun into a base bath. The base makes the chitosan polymer and nylon chains insoluble.

Example 12

A wool digest is heated in the presence of ε-caprolactam to induce ring-opening polymerization and form nylon 6 grafts on the chitosan polymer. Microphase separation may occur upon removal of the solvent by spinning or other means known in the art.

Example 13

Chitosan is heated in the presence of a lactone (a cyclic ester such as ε-caprolactone) to induce ring-opening polymerization and to form polyester grafts on the chitosan polymer. If the polyester chains are not too long, the complex will be soluble in acid because of any unreacted amines on chitosan and the hydroxyls at the end of the grafted nylon chains. The acid solution of this material is then extruded/spun into a base bath. The base makes the chitosan polymer with grafted polyester chains insoluble.

Example 14

A wool digest is heated in the presence of a lactone (a cyclic ester such as ε-caprolactone) to induce ring-opening polymerization and to form polyester grafts on the polypeptide. If the polyester chains are not too long, the complex will be soluble in acid because of the hydrophilic functional groups on the wool extract and the hydroxyls at the end of the grafted nylon chains. Removal of the solvent by spinning or other means known in the art may induce microphase separation.

Example 15

Chitosan is heated in the presence of a cyclic compound having the form: —NHCHRC(O)OC(O)—, where R is a side chain including those found on amino acids. The amines on chitosan react with this compound, releasing carbon dioxide and leading to formation of a linear, amine-terminated polymer with the repeat unit: —NHCHRC(O)—.

Example 16

A wool extract is heated in the presence of a cyclic compound having the form: —NHCHRC(O)OC(O)—, where R is a side chain including those found on amino acids. The amines on the polypeptide react with this compound, releasing carbon dioxide and leading to formation of a linear, amine-terminated polymer with the repeat unit: —NHCHRC(O)—.

Example 17

Chitosan, through its amines or carboxyl groups, is reacted with terephthaloylchloride and 1,4-phenylenediamine to form a "Kevlar-like" polymer; that is, a polymer having many of the physical characteristics of Kevlar. Kevlar is flame-resistant, extremely strong, and more resistant to solvents, chemicals and oxidants than aliphatic polyameds such as Nylon 6. If enough chitosan is present, the resulting polymer is soluble in acidic media and capable of being extruded into a base bath. An alcohol may be used as a cosolvent to help keep the polymer soluble. This makes possible the manufacture of a "Kevlar-like" polymer that is much more easily processed than Kevlar itself.

Example 18

A wool digest is reacted with terephthaloylchloride and 1,4-phenylenediamine to form a "Kevlar-like" polymer. An alcohol may be used as a cosolvent to help keep the polymer soluble. This makes possible the manufacture of a "Kevlar-like" polymer that is much more easily processed than Kevlar itself.

Example 19

Chitosan is reacted with isophthaloylchloride and 1,3-phenylenediamine to form a "Kevlar-like" polymer, following the procedures of Example 17.

Example 20

A wool extract is reacted with isophthaloylchloride and 1,3-phenylenediamine to form a "Kevlar-like" polymer, following the procedures of Example 18.

Example 21

The procedures of Example 17 are followed, where terephthalic or isophthalic acid and an amine of the form $H_2N(CH_2)_nNH_2$ (n=2–18) are heated to produce an amide.

Example 22

The procedures of Example 18 are followed, where terephthalic or isophthalic acid and an amine of the form $H_2N(CH_2)_nNH_2$ (n=2–18) are heated to produce an amide.

Example 23

Chitosan, terephthalic acid, and ethylene glycol are heated to make a polyester hybrid material.

Example 24

A wool extract, terephthalic acid, and ethylene glycol are heated to make a polyester hybrid material.

Example 25

Chitosan, terephthalic acid, and butylene glycol are heated to make a polyester hybrid material.

Example 26

A wool extract, terephthalic acid, and butylene glycol are heated to make a polyester hybrid material.

Example 27

Chitosan is reacted with a mixture of a monomer that contains two or more carboxyl groups (such as succinic acid, citric acid, maleic acid, oxalic acid, terephthalic acid, isophthalic acid, glutaric acid, adipic acid, etc.), and a monomer that contains two or more hydroxyl or amine groups to make polyesters or polyamides, respectively.

Example 28

A wool extract is reacted with a mixture of a monomer that contains two or more carboxyl groups (such as succinic acid, citric acid, maleic acid, oxalic acid, terephthalic acid, isophthalic acid, glutaric acid, adipic acid, etc.), and a monomer that contains two or more hydroxyl or amine groups to make polyesters or polyamides, respectively.

Example 29

Chitosan is allowed to react with a silane that has an amine-reactive group on it such as glycidylpropyltrimethoxysilane or succinimidylpropyltrimethoxysilane. This adduct can then condense with other silanol-containing molecules to form siloxane polymers. The silanol-containing molecules may be functionalized in a variety of ways.

Example 30

A wool extract is allowed to react with a silane that has an amine-reactive group on it such as glycidylpropyltrimethoxysilane or succinimidylpropyltrimethoxysilane. This adduct can then condense with other silanol-containing molecules to form siloxane polymers. The silanol-containing molecules may be functionalized in a variety of ways.

Example 31

The method of Example 29, but where the silanol-containing molecules that condense to form siloxane polymers contain amino groups, making the resulting hybrid material soluble in acidic media.

Example 32

The method of Example 30, but where the silanol-containing molecules that condense to form siloxane polymers contain amino groups, making the resulting hybrid material soluble in acidic media.

Example 33

Chitosan is mixed with hexamethylene diamine and adipic acid and the mixture is heated until polymerization takes place.

Example 34

A wool extract is mixed with hexamethylene diamine and adipic acid and the mixture is heated until polymerization takes place.

Example 35

A wool digest is mixed with low $T_g$ polymers (elastomeric blocks) that contain functional groups that are reactive with functional groups on wool such as amines, alcohols, sulfhydryls, or carboxyls. Potentially reactive groups include epoxides (oxiranes), anhydrides, acid chlorides, sulfonyl chlorides, NHS-esters, maleimides, etc.

Example 36

A wool digest is derivatized with an acrylate or methacrylate to place unsaturated groups on its surface. Possible methods of doing this include direct reaction of free hydroxyls or amines in digested wool with (meth)acryloyl chloride or glycidyl methacrylate, or transesterification with a (meth)acrylic ester such as methyl (meth)acrylate. The (meth)acrylated wool is then copolymerized with one or more unsaturated monomers to form a wool/synthetic hybrid material. Possible monomers include (meth)acrylic acid; alkyl (meth)acrylates, e.g., stearyl (meth)acrylate, 2-ethylhexyl (meth)acrylate, isobornyl acrylate; aromatic acrylates, e.g., phenol ethoxylate monoacrylate: $C_6H_5O(CH_2CH_2O)_nC(O)CH=CH_2$; fluorinated (meth)acrylates; (meth)acrylates with one or more functional groups such as hydroxyls, e.g., hydroxyethyl (meth)acrylate, (meth) acrylates esterified with sugars; amines, e.g., dimethylaminoethyl (meth)acrylate; carboxyl groups, e.g., β-carboxyethyl (meth)acrylate; polyethyleneglycol (meth) acrylate; maleic anhydride; maleic acid and esters thereof; vinyl chloride; vinylidine chloride; vinylidine fluoride; vinyl acetate; styrene; etc. Reactivity could also occur with polymers or oligomers that contain polymerizable groups on them such as (meth)acrylated aliphatic urethane oligomers, (meth)acrylated aromatic urethane oligomers, (meth) acrylated polyester oligomers, (meth)acrylated bisphenol A epoxy oligomers, epoxy soya oil (meth)acrylate oligomer, epoxy novolac (meth)acrylate. Monomers with 2 or more polymerizable groups, e.g., polyethyleneglycol diacrylate, dipentaerythritol hydroxy pentaacrylate, 1,6-hexanediol diacrylate pentaerythritol triacrylate, tetraethylene glycol dimethacrylate, tris(2-hydroxy ethyl) isocyanurate triacrylate, highly alkoxylated triacrylate (SR-9035 from Sartomer), glycerol propoxy triacrylate, pentaerythritol tetraacrylate, could also be employed.

Example 37

A wool digest is reacted with and bonded to chitosan through a chemical that contains linking groups capable of joining functional groups on wool with functional groups on chitosan.

Example 38

A wool digest is reacted with and bonded to dextran or another cellulosic material through a chemical that contains linking groups capable of joining functional groups on wool with functional groups on a cellulosic. Cellulosics could include, but would not be limited to digests of cotton or modified cotton, dextran, diethylaminoethyl dextran, dextran sulfate, starch, chitin, chitosan, carboxymethylcellulose (free acid or salt), diethylaminoethyl cellulose, chondroitin-4-sulfate, guarans (guar gums), hydroxypropyl guar, konjac, locust bean gums, xanthan, alginic acid (free acid or salt), or carrageenan (ι, κ, and λ forms).

Example 39

A naturally available polymeric or oligomeric material is covalently bonded to a synthetic set of one or more monomers or polymers to produce a hybrid material that has mixing of the original functionalities on a molecular scale.

Example 40

A fiber having a core-shell morphology is produced where the core is a synthetic polymeric material and the shell is a polymeric material from a natural source.

Example 41

A fiber having a core-shell morphology is produced where the shell is a synthetic polymeric material and the core is a polymeric material from a natural source.

Example 42

A fiber having a core-shell morphology is produced where the core is a hybrid (natural-synthetic) polymeric material and the shell is a polymeric material from a natural source.

Example 43

A fiber having a core-shell morphology is produced where the shell is a hybrid (natural-synthetic) polymeric material and the core is a polymeric material from a natural source.

What is claimed is:

1. A hybrid polymer material comprising a set of naturally occurring building blocks and a set of synthetic building blocks, the two sets of building blocks being combined at a molecular or nanoscopic level via chemical bonds.

2. A hybrid polymer material according to claim 1, the material being homogeneous.

3. A hybrid polymer material according to claim 1, the material being microphase-separated.

4. A hybrid polymer material according to claim 1 wherein one set of building blocks forms polymer blocks that are crystalline and the other set of building blocks forms polymer blocks that are elastomeric.

5. A hybrid polymer material according to claim 1 wherein the naturally occurring building blocks form polymer blocks that are crystalline and the synthetic building blocks form polymer blocks that are elastomeric.

6. A hybrid polymer material according to claim 1 wherein the naturally occurring building blocks are selected from the group consisting of monosaccharides, disaccharides, polysaccharides, wood derivatives, lipids, proteins, RNA, DNA, lignin, amino acids, oligopeptides, polypeptides, and wool digests.

7. A hybrid polymer material according to claim 1 wherein the synthetic building blocks are selected from the group consisting of poly(dimethylsiloxane), polyethylene glycols, polypropyleneglycols, butadiene, styrene-butadiene, styrene maleic anhydride, polyethylene, polypropylene, polyamides, polyesters, polyacrylic acid, polyvinylchloride, polyvinylacetate, polyvinylidine fluoride, polytetrafluoroethylene, polyacrylamide, poly(acrylic acid-co-maleic acid), polyacrylonitrile, polyallylamine, polyaniline, polyethyleneimine, polyacrylates, polymethacrylates, polyethyleneterephthalate, polybutylene terephthalate, poly (1-butene), nylon 6, nylon 66, aromatic polyamides, poly(bisphenol A-co-epichlorohydrin), PBI, and copolymers or mixtures thereof.

8. A hybrid polymer material according to claim 1, wherein the material is in the form of a fiber.

9. A method for making a hybrid polymer material, the method comprising the steps of:

(a) mixing together a set of naturally occurring building blocks and a set of synthetic building blocks, the building blocks of each set comprising functional groups that react with functional groups on the building blocks of the other set; and (b) polymerizing the mixture of building blocks;

to give a hybrid polymer material that is homogeneous or microphase-separated.

10. A method according to claim 9 wherein the naturally occurring building blocks are selected from the group consisting of monosaccharides, disaccharides, polysaccharides, wood derivatives, lipids, proteins, RNA, DNA, lignin, amino acids, oligopeptides, polypeptides, and wool digests.

11. A method according to claim 9 wherein the synthetic building blocks are selected from the group consisting of poly(dimethylsiloxane), polyethylene glycols, polypropyleneglycols, butadiene, styrene-butadiene, styrene maleic anhydride, polyethylene, polypropylene, polyamides, polyesters, polyacrylic acid, polyvinylchloride, polyvinylacetate, polyvinylidine fluoride, polytetrafluoroethylene, polyacrylamide, poly(acrylic acid-co-maleic acid), polyacrylonitrile, polyallylamine, polyaniline, polyethyleneimine, polyacrylates, polymethacrylates, polyethyleneterephthalate, polybutylene terephthalate, poly(1-butene), nylon 6, nylon 66, aromatic polyamides, poly(bisphenol A-co-epichlorohydrin), PBI, and copolymers or mixtures thereof.

12. A hybrid polymer material according to claim 8, the material being homogeneous.

13. A hybrid polymer material according to claim 8, the material being microphase-separated.

14. A hybrid polymer material according to claim 8 wherein one set of building blocks forms polymer blocks that are crystalline and the other set of building blocks forms polymer blocks that are elastomeric.

15. A hybrid polymer material according to claim 8 wherein the naturally occurring building blocks are selected from the group consisting of monosaccharides, disaccharides, polysaccharides, wood derivatives, lipids, proteins, RNA, DNA, lignin, amino acids, oligopeptides, polypeptides, and wool digests.

16. A hybrid polymer material according to claim 8 wherein the synthetic building blocks are selected from the group consisting of poly(dimethylsiloxane), polyethylene glycols, polypropyleneglycols, butadiene, styrene-butadiene, styrene maleic anhydride, polyethylene, polypropylene, polyamides, polyesters, polyacrylic acid, polyvinylchloride, polyvinylacetate, polyvinylidine fluoride, polytetrafluoroethylene, polyacrylamide, poly(acrylic acid-co-maleic acid), polyacrylonitrile, polyallylamine, polyaniline, polyethyleneimine, polyacrylates, polymethacrylates, polyethyleneterephthalate, polybutylene terephthalate, poly (1-butene), nylon 6, nylon 66, aromatic polyamides, poly(bisphenol A-co-epichlorohydrin), PBI, and copolymers or mixtures thereof.

17. An object made from a hybrid polymer material, the hybrid polymer material comprising a set of naturally occurring building blocks and a set of synthetic building blocks, the two sets of building blocks being combined at a molecular or nanoscopic level via chemical bonds.

18. An object according to claim 17 wherein the hybrid polymer material is homogeneous.

19. An object according to claim 17 wherein the hybrid polymer material is microphase-separated.

20. An object according to claim 17, wherein the object is in the form of a web.

21. An object according to claim 20 wherein the hybrid polymer material is homogeneous.

22. An object according to claim 20 wherein the hybrid polymer material is microphase-separated.

23. An object according to claim 20 wherein one set of building blocks forms polymer blocks that are crystalline and the other set of building blocks forms polymer blocks that are elastomeric.

24. An object according to claim 20 wherein the naturally occurring building blocks are selected from the group consisting of monosaccharides, disaccharides, polysaccharides, wood derivatives, lipids, proteins, RNA, DNA, lignin, amino acids, oligopeptides, polypeptides, and wool digests.

25. An object according to claim 20 wherein the synthetic building blocks are selected from the group consisting of poly(dimethylsiloxane), polyethylene glycols, polypropyleneglycols, butadiene, styrenebutadiene, styrene maleic anhydride, polyethylene, polypropylene, polyamides, polyesters, polyacrylic acid, polyvinylchloride, polyvinylacetate, polyvinylidine fluoride, polytetrafluoroethylene, polyacrylamide, poly(acrylic acid-co-maleic acid), polyacrylonitrile, polyallylamine, polyaniline, polyethyleneimine, polyacrylates, polymethacrylates, polyethyleneterephthalate, polybutylene terephthalate, poly(1-butene), nylon 6, nylon 66, aromatic polyamides, poly(bisphenol A-co-epichlorohydrin), PBI, and copolymers or mixtures thereof.

* * * * *